United States Patent [19]

Kopp et al.

[11] Patent Number: 5,774,173
[45] Date of Patent: Jun. 30, 1998

[54] VIDEO-TELEPHONE ANSWERING SET THAT STORES A SINGLE PICTURE OF VIDEO MESSAGE INFORMATION

[75] Inventors: Dieter Kopp, Hemmingen; Detlef Müller, Renningen, both of Germany

[73] Assignee: Alcatel N.V., Rijsuiyk, Netherlands

[21] Appl. No.: 863,642

[22] Filed: May 28, 1997

Related U.S. Application Data

[63] Continuation of Ser. No. 239,598, May 9, 1994, abandoned.

[30] Foreign Application Priority Data

May 14, 1993 [DE] Germany ............... 43 16 168.5

[51] Int. Cl.$^6$ ..................................... H04N 7/14
[52] U.S. Cl. ............................................. 348/14
[58] Field of Search .................... 348/14, 15, 16, 348/17, 18, 19, 13; 379/93.17, 93.21, 88, 89

[56] References Cited

U.S. PATENT DOCUMENTS

| | | |
|---|---|---|
| 5,018,186 | 5/1991 | Kimura et al. . |
| 5,046,079 | 9/1991 | Hashimoto . |
| 5,055,920 | 10/1991 | Illetschko et al. . |
| 5,063,440 | 11/1991 | Hong . |
| 5,153,720 | 10/1992 | Kawai . |
| 5,164,982 | 11/1992 | Davis . |
| 5,396,269 | 3/1995 | Gotoh et al. . |
| 5,414,457 | 5/1995 | Kadowaki et al. . |
| 5,448,285 | 9/1995 | Kadowaki . |

FOREIGN PATENT DOCUMENTS

| | | |
|---|---|---|
| 4236176 | 10/1992 | Germany . |
| 0193681 | 8/1988 | Japan . |
| 0132261 | 5/1989 | Japan . |
| 0137765 | 5/1989 | Japan . |
| 0199951 | 8/1990 | Japan . |
| 0136546 | 6/1991 | Japan . |
| 0201649 | 9/1991 | Japan . |

OTHER PUBLICATIONS

Patent Abstracts of Japan, vol. 15, No. 459 (E–1136), Nov. 21, 1991 & JP–A–03 196 759 (Fujitsu General Ltd) Aug. 28, 1991.
Patent Abstracts of Japan, vol. 15, NO. 408 (E–1123), Oct. 17, 1991 & JP–A–03 166 888 (NEC Corp), Jul. 18, 1991.
Patent Abstracts of Japan, vol. 17, No. 253 (E–1367), May 19, 1993 & JP–A–04 372 294 (Murata Mach Ltd), Dec. 25, 1992.
Patent Abstracts of Japan, vol. 15, No. 494 (E–1145), Dec. 13, 1991 & JP–A–03 216 091 (Hitachi Ltd), Sep. 24, 1991.
Patent Abstracts of Japan, vol. 13, No. 213 (E–759), May 18, 1989 & JP–A–01 024 688 (Hitachi Ltd), Jan. 26, 1989.
Patent Abstracts of Japan, vol. 15, No. 453 (E–1134), Nov. 18, 1991 & JP–A–03 191 648 (Canon Inc.), Aug. 21, 1991.
Patent Abstracts of Japan, vol. 15, No. 304 (E–1096), Aug. 5, 1991 & JP–A–03 108 857 (Nec Corp), May 9, 1991.

*Primary Examiner*—Stella Woo

[57] ABSTRACT

A (BA) for picture and speech information.

The video-telephone answering set (BA) stores only particular, essential single pictures, preferably in synchronism with the speech, in a storage means (HS). By suitable signalling, the caller can determine the single pictures to be stored. For the storage means (HS), a semiconductor memory is proposed.

14 Claims, 1 Drawing Sheet

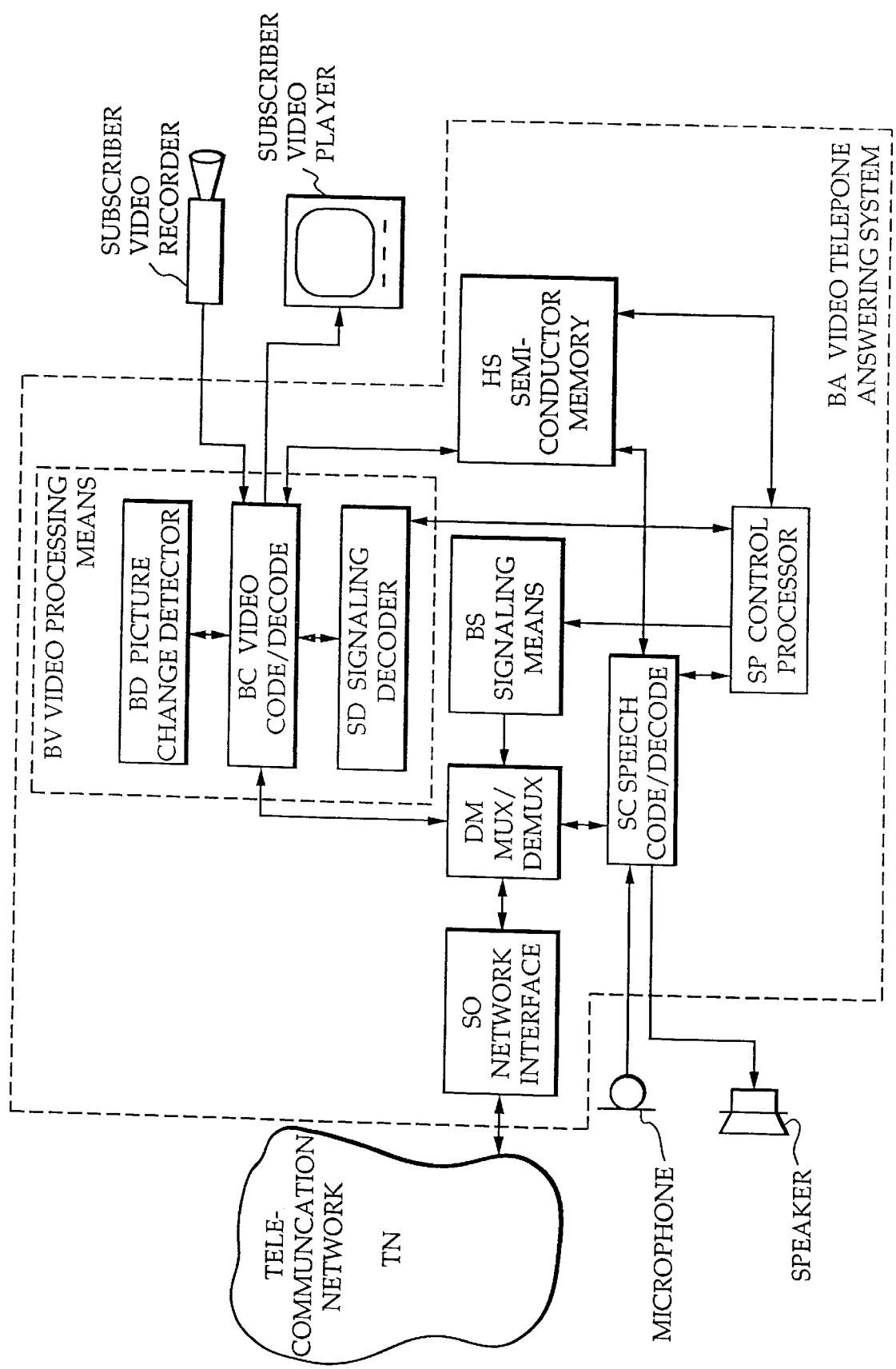

VIDEO-TELEPHONE ANSWERING SET THAT STORES A SINGLE PICTURE OF VIDEO MESSAGE INFORMATION

This application is a continuation of application Ser. No. 08/239,598 filed on May 9, 1994, now abandoned.

TECHNICAL FIELD

The present invention relates to a video-telephone answering set sets having at least one storage area for picture information or picture and speech information incoming and/or outgoing via a telecommunication network.

BACKGROUND OF THE INVENTION

Such a video-telephone answering set is disclosed in Patent Application P 42 36 176.1, which was not published prior to the filing data of the present application. Through the video-telephone answering set described therein, moving- and/or still-picture information, preferably together with speech information, can be transmitted from a calling subscriber of a telecommunication network to a called subscriber of the telecommunication network at any time, regardless of whether the called subscriber can be reached at the moment or not. To be able to transmit a recorded video message to the calling subscriber and record incoming picture and/or speech in-formation, the video-telephone answer set has a storage means in the form of a video recorder. The storage means can also be a so-called video RAM, which stores the picture and/or speech information in digital form. Since, according to the prior art, all the incoming picture and speech information is stored, very large quantities of data accrue very quickly even with great data compression, which results in poor quality. Therefore, the capacity of the video RAM will be fully utilized even if only few messages are left.

SUMMARY OF THE INVENTION

It is the object of the invention to provide a video-telephone answering set for picture information or picture and speech information, and avoid the above-described disadvantages of the prior art in a simple manner.

According to the invention, this object is attained by a video-telephone answering set comprising at least one storage means for picture information or picture and speech information incoming and/or outgoing via a telecommunication network, characterized in that it includes at least one means which selects from the incoming picture information, according to predetermined criteria, that information which will be stored in the at least one storage means.

Advantageously, the calling subscriber, by suitable signalling, can inform the video-telephone answering set which information it considers essential for storage in the storage means.

According to a particularly advantageous aspect of the invention, the storage means is a semiconductor memory, which permits good picture quality during the display of still images and is not subjected to mechanical wear.

Another advantage of the video-telephone answering set is that it can also be used to store important information, such as information of an important document, during a completed call between subscribers of the telecommunication network, thus serving as a notebook, so to speak.

Further advantageous features of the invention are defined in the dependent claims.

BRIEF DESCRIPTION OF THE DRAWING

The invention will become more apparent from the following description of an embodiment thereof when taken in conjunction with the accompanying drawing.

The single FIGURE shows an embodiment of a video-telephone answering set in accordance with the invention.

BEST MODE FOR CARRYING OUT THE INVENTION

The FIGURE shows a video-telephone answering set BA with a semiconductor memory HS, which is connected by bi-directional data lines to a control processor SP, a speech codec SC, and a video codec BC. The semiconductor memory HS may be a flash EEPROM, for example. The video codec BC, a picture-change detector BD, and a signalling decoder SD form a unit BV for evaluating and processing picture information. The video codec BC is connected to the picture-change detector BD and the signalling decoder SD by bidirectional data lines. Picture-change detector BD and signalling decoder SD may also be incorportated in the video codec BC.

The speech codec SC is connected by bidirectional data lines to a data multiplexer/demultiplexer DM and the control processor SP, which is also bidirectionally connected to the signalling decoder SD and, thus, to the unit BV for evaluating and processing picture information. From the control processor SP there is a unidirectional connection to a signalling means BS for generating a signalling message to confirm that picture and/or speech information has been stored in the semiconductor memory HS. The signalling means BS is therefore coupled to the data multiplexer/demultiplexer DM, which is connected via a network interface SO to a telecommunication network TN. The telecommunication network TN is an ISDN network with a bit rate of 64 kb/s but may also be a broadband ISDN, such as the precursor broadband network VBN of Deutsche Bundespost Telekom, or an ATM (asynchronous transfer mode) network or an MAN (metropolitan area network). In these cases, the video-telephone answering set BA has suitable network interfaces.

To perform the function of a video-telephone answering set as such, it is frequently not necessary to store a lip-synchronous picture. When transmitting messages to the called subscriber, it suffices to store a single picture, such as a document picture, preferably with speech added thereto. A single picture is also sufficient for the video message stored in the storage means for welcoming the calling subscriber. It may even be confusing to the calling subscriber if he receives a lip-synchronous moving picture of the called subscriber although the latter is not present. According to the invention, therefore, the data essential for the information flow between the subscribers is stored in the semiconductor memory.

If a calling video-telephone subscriber of the telecommunication network TN wants to talk to a called video-telephone subscriber of the telecommunication network TN who is not present and, therefore, has switched on the video-telephone answering set BA, the control processor SP, after having detected the call request, will put the video-telephone answering set BA in a playback mode. This means that a single picture stored in the semiconductor memory HS, together with speech information also stored in the semiconductor memory HS, is transmitted as a welcome message through the telecommunication network TN to the calling video-telephone subscriber. The control processor SP controls this procedure so that the picture and speech information required for the single picture can be decompressed in the video codec BC and speech codec SC, respectively, then multiplexed in the data multiplexer/demultiplexer DM, and transmitted through the network interface SO so as to be received by the calling video-subscriber in synchronism. Thereafter, the calling video-telephone subscriber can send moving and/or single-picture information, preferably also combined with speech information, to the video-telephone answering set BA. The picture and speech information arriving via the telecommunication network TN and the network interface SO is demultiplexed by the data multiplexer/demultiplexer DM, and the speech information is fed to the speech codec SC, while the picture information is fed to the video codec BC, and thus to the unit BV for evaluating and processing picture information. The picture-change detector BD in this unit BV evaluates the incoming picture information according to predetermined criteria, so that, under control of the control processor SP, only predetermined picture information corresponding to single pictures will be stored in compressed form in the semiconductor memory HS. Predetermined criteria may be, for example, a fixed time interval, a greater or lesser change in the information content of the incoming picture information, or a combination of these two criteria. This means that if the information content of the incoming picture information has not changed after a predetermined time, e.g., 10 seconds, the next picture information will be stored in the semiconductor memory HS as a single picture, preferably using the compression algorithm recommended by the ISO JPEG (Joint Photographics Experts Group).

The speech codec SC for encoding the incoming speech information is preferably a frame-based speech codec. The control processor SP generates a control file which contains the time assignment of speech information to be stored in the semiconductor memory HS and of associated speech information. This control file is also stored in the semiconductor memory HS.

In addition to the picture-change detector BD, the signalling decoder SD is contained in the unit BV for evaluating and processing picture information. If the calling video-telephone subscriber has sent to the video-telephone answering set BA a signalling message to the effect that one or more single pictures are to be stored as important information, the signalling decoder SC can evaluate this incoming signalling message. The control processor SP then controls the storing of this important picture information and of any associated speech information in the manner described above. If the calling video-telephone subscriber signals in the H.221 in-band protocol, the signalling of those single pictures can be indicated by means of the so-called multi-byte-extension (MBE) instructions; if the calling subscriber signals in the H.261 protocol, the signalling can be indicated by means of the so-called picture-extra-insertion (PEI) bit and the PSPARE field. The protocols H.221 and H.261 are recommendations of the CCITT.

It is possible, for example, to signal to the video-telephone answering set BA, by depressing a correspondingly assigned key on the set of the calling video-telephone subscriber, that the next incoming single picture represents picture information with an essential information content and should be stored by all means. With such a manual instruction to store a single picture, the picture-change detector BD can be dispensed with.

A corresponding procedure which results in important single pictures being stored in the semiconductor memory HS is also possible during a completed call between a calling video-telephone subscriber and a called video-telephone subscriber of the telecommunication network TN. The video-telephone answering set is then used as a sort of notebook.

Furthermore, to confirm the storage of the single pictures signalled to be important, the video-telephone answering set BA may include a means BS which generates a signalling message confirming the storage. The control processor SP controls the generation of this signalling message, which is then transmitted via the data multiplexer/demultiplexer DM and the network interface SO to the calling video-telephone subscriber.

We claim:

1. A video-telephone answering set (BA) to be situated at a subscriber's location, comprising:
    a receiving means (DM) for receiving a first number of signals comprising at least a first video signal corresponding to a first picture and a second video signal corresponding to a second picture and a third signal, each one of these signals originating from an other subscriber;
    a comparing means (BD, SD) coupled to said receiving means (DM) for comparing at least two signals and for generating a result signal in response to a comparison result;
    a selecting means (SP, BC) coupled to said receiving means (DM) and to said comparing means (BD, SD) for, in response to said result signal, selecting a second number of signals, which second number of signals is smaller than said first number of signals, and which said second number of signals comprises at least one video signal, and which said second number of signals comprises at most one of said first and second video signals; and
    a storing means (HS) coupled to said selecting means (SP, BC) for storing said selected second number of signals.

2. The video-telephone answering set (BA) according to claim 1,
    wherein said third signal is an indication signal originating from a user calling said video-telephone answering set (BA);
    wherein said at least two signals to be compared include said indication signal and a predefined signal stored in said video-telephone answering set (BA); and
    wherein said result signal indicates which one of said video signals should be selected and should be stored.

3. The video-telephone answering set (BA) according to claim 2,
    wherein said comparing means comprises a signalling decoder (SD) for comparing said indication signal with said predefined signal.

4. The video-telephone answering set (BA) according to claim 1,
    wherein said third signal is a third video signal corresponding with a third picture;
    wherein said at least two signals to be compared include a further indication signal originating from a user of said video-telephone answering set (BA) and a predefined signal stored in said video-telephone answering set (BA); and
    wherein said result signal indicates which one of said video signals should be selected and should be stored.

5. The video-telephone answering set (BA) according to claim 4, wherein said comparing means (BD, SD) comprises a signalling decoder (SD) for comparing said further indication signal with said predefined signal.

6. The video-telephone answering set (BA) according to claim 1,
    wherein said third signal is a third video signal corresponding with a third picture;
    wherein said at least two signals to be compared include at least two of said video signals; and wherein said result signal indicates which one of said video signals should be selected and should be stored.

7. The video-telephone answering set (BA) according to claim 6, wherein said comparing means (BD, SD) comprises a picture-change detector (BD) for comparing said video signals.

8. A video-telephone answering set (BA) comprising:
- a video message processing means (BV, BD, BC, SD) which selects a single picture of video message information from picture information signals, picture and information data signals or picture and speech information signals incoming or outgoing via a telecommunication network (TN), according to predetermined criteria, and provides a single picture video message information signal corresponding to the single picture of video message information;
- a single picture video message information storage means (HS) for storing the single picture video message information signal;
- wherein the video message processing means (BV, BD, BC, SD) includes a video codec (BC) connected to the single picture video message information storage means (HS) for coding and decoding the information stored in the single picture video message information storage means (HS); and
- wherein the video message processing means (BV, BD, BC, SD) includes a picture-change detector (BD) connected to the video codec (BC) which can detect a change in the picture information signals, the picture and information data signals or the picture and speech information signals.

9. A video-telephone answering set according to claim 8, wherein the video message processing means (BV, BD, BC, SD) includes a signalling decoder (SD) connected to the video codec (BC) which decodes an incoming signalling message containing data on picture information to be selected out of the picture information signals, the incoming picture information data signals or picture and speech information signals to be stored in the at least one single picture video message information storage means (HS).

10. A video-telephone answering set according to claim 8, wherein the single picture video message information storage means (HS) is a semiconductor memory.

11. A video-telephone answering set according to claim 8, wherein the single picture video message information signal is synchronous and is stored synchronously in the single picture video message information storage means (HS).

12. A video-telephone answering set according to claim 8, further comprising:
- a means (BS) for generating a signalling message confirming that picture and/or speech information has been stored in the at least one single picture video message information storage means (HS).

13. A video-telephone answering set according to claim 8, wherein the video-telephone answering set comprises means for storing, in the single picture video message information storage means (HS), picture and speech information incoming during a call between subscribers of the telecommunication network (TN).

14. A video-telephone answering set according to claim 8, wherein the single picture video message information signal stored in the single picture video message information storage means (HS) represents a document picture.

* * * * *

UNITED STATES PATENT AND TRADEMARK OFFICE
CERTIFICATE OF CORRECTION

PATENT NO. : 5,774,173
DATED : June 30, 1998
INVENTOR(S) : Kopp et al.

It is certified that error appears in the above-indentified patent and that said Letters Patent is hereby corrected as shown below:

Title page,

Item [57] ABSTRACT

Line 1, after "A" please insert --video-telephone answering set--.

Signed and Sealed this

Twentieth Day of October, 1998

Attest:

BRUCE LEHMAN

*Attesting Officer*  *Commissioner of Patents and Trademarks*